(12) United States Patent
Govind et al.

(10) Patent No.: US 6,496,081 B1
(45) Date of Patent: Dec. 17, 2002

(54) TRANSMISSION EQUALIZATION SYSTEM AND AN INTEGRATED CIRCUIT PACKAGE EMPLOYING THE SAME

(75) Inventors: Anand Govind, Fremont, CA (US); Aritharan Thurairajaratnam, Fremont, CA (US)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 09/967,195

(22) Filed: Sep. 28, 2001

(51) Int. Cl.[7] .................................. H04B 3/14
(52) U.S. Cl. ..................... 333/28 R; 333/246; 174/261
(58) Field of Search .............................. 333/28 R, 246, 333/238, 204; 361/772; 174/261, 262

(56) References Cited

U.S. PATENT DOCUMENTS 5,818,315 A * 10/1998 Moongilan ................. 333/238
6,303,871 B1 * 10/2001 Zu et al. .................... 174/250
2001/0010271 A1 * 8/2001 Lin et al. .................... 174/255

\* cited by examiner

Primary Examiner—Michael Tokar
Assistant Examiner—James H. Cho
(74) Attorney, Agent, or Firm—Hitt, Gaines & Boisbrun, PC

(57) ABSTRACT

The present invention provides a transmission equalization system for use with an integrated circuit package employing a substrate. In one embodiment, the transmission equalization system includes a signal transmission subsystem having a pair of transmission line conductors located in the substrate and employing a differential electrical signal. The transmission equalization system also includes an equalization subsystem located proximate the pair of transmission line conductors that employs at least one aperture positioned and oriented to provide a substantially equivalent transmission environment for each of the pair of transmission line conductors.

21 Claims, 3 Drawing Sheets

TRANSMISSION EQUALIZATION SYSTEM AND AN INTEGRATED CIRCUIT PACKAGE EMPLOYING THE SAME

TECHNICAL FIELD OF THE INVENTION

The present invention is directed, in general to integrated circuit packaging, and, more specifically, to a transmission equalization system and an integrated circuit package employing the same.

BACKGROUND OF THE INVENTION

Reliable operation of electronic devices, especially semiconductor devices, is of a primary importance today. Often the success of a company may depend on the success at which new technology is reliably established, especially in a developing market. Particularly challenging is the general market demand for devices that perform more functions at increasingly faster operating speeds. This demand for increased functionality usually drives the device design toward more complexity, which typically involves higher component densities that may lead to higher packaging densities. Higher densities alone complicate the environment for signal transmissions within the device. The demand for faster signal speeds further exacerbates this condition causing the environments and associated designs that were acceptable at slower signal speeds to cross into the realm of unacceptability.

Signal environments that exist in an integrated circuit die may require special attention to insure that the ever closer proximity of signals will not generate cross-talk or other interference conditions. Although challenging, these on-chip detrimental conditions may be overcome through appropriate layout and shielding designs. High speed, high density packaging substrate design, however, typically involves a constant trade-off between cost and electrical signal integrity requirements. To reduce costs, signals are often routed in a microstrip construction where the signal only references one power or ground plane.

High-speed, high-density substrate design for multilayer, organic flip chip packages also involves constant trade-off between the substrate design rules and electrical signal integrity requirements. Metal planes are frequently used in the substrate stackup for noise shielding and to minimize signal cross-talk. From a signal integrity standpoint, solid metal planes are preferred since they introduce the fewest discontinuities. However, from a substrate manufacturing and reliability standpoint, voided planes are preferred since they promote adhesion between the substrate layers and provide vents for moisture egress at elevated temperatures without causing packaging delamination. Therefore, there is a trade-off between signal integrity and substrate integrity in the design of a substrate.

When a four-layer package substrate is used in a packaging assembly configuration, the traces routed on the top layer are typically subject to several discontinuities in their electrical environment. One source of discontinuity is the microstrip trace routing from the central area employing a semiconductor die to the extremities of the package over a single power or ground plane. The microstrip conductors are often routed in pairs to accommodate a differential signal employed between the two conductors. In this configuration, if either one of the pair of conductors experiences a different electrical environment from an environmental discontinuity, a signal imbalance condition typically occurs. This signal imbalance provides a distortion that may cause signal errors, enhanced reflected noise and losses during signal transmission. Of course, similar problems may occur with multilayer boards having more than four layers or that employ strip line configurations.

Voids in the voided planes typically have a uniform cross-section and display a uniform pattern with respect to the metal sheet. However, these voids typically impact each of a pair of conductors that reside in a layer above in a random manner. This randomness causes an environmental discontinuity thereby providing a different electrical environment to each of the pair of conductors. This causes a signal imbalance condition having the adverse effects mentioned above.

Accordingly, what is needed in the art is a way to provide a metal layer having voids or apertures that does not differentially distort the electrical environment associated with a pair of conductors.

SUMMARY OF THE INVENTION

To address the above-discussed deficiencies of the prior art, the present invention provides a transmission equalization system for use with an integrated circuit package employing a substrate. In one embodiment, the transmission equalization system includes a signal transmission subsystem having a pair of transmission line conductors located in the substrate and employing a differential electrical signal. The transmission equalization system also includes an equalization subsystem located proximate the pair of transmission line conductors and employing at least one aperture positioned and oriented to provide a substantially equivalent transmission environment for each of the pair of transmission line conductors.

In another aspect, the present invention provides a method of manufacturing an integrated circuit package. The method of manufacturing includes providing a substrate. The method further includes forming at least a pair of transmission line conductors in the substrate and positioning and orienting at least one aperture proximate the pair of transmission line conductors to provide a substantially equivalent transmission environment for each of the pair of transmission line conductors.

In yet another aspect, the present invention provides an integrated circuit package that includes a substrate. The integrated circuit package also includes a transmission equalization system with a signal transmission subsystem having a pair of transmission line conductors located in the substrate and employing a differential electrical signal. The transmission equalization system also includes an equalization subsystem located proximate the pair of transmission line conductors that employs at least one aperture positioned and oriented to provide a substantially equivalent transmission environment for each of the pair of transmission line conductors.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
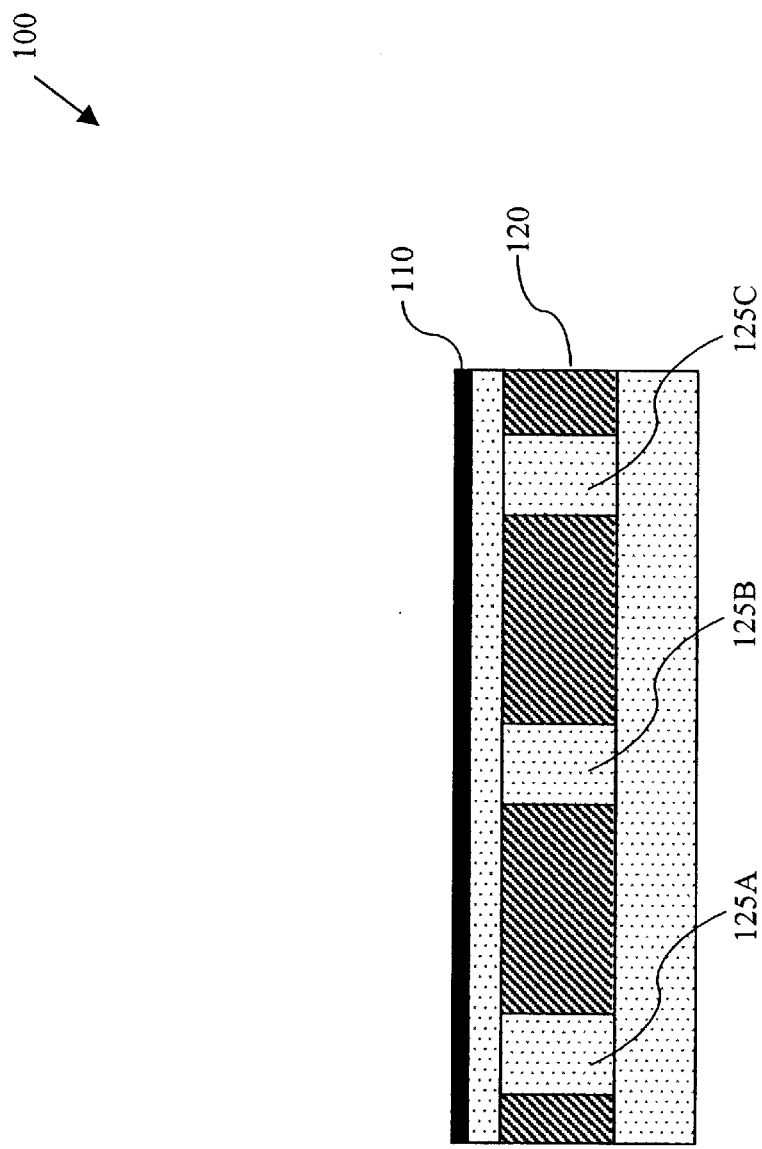
FIG. 1 illustrates a cross-sectional view of an embodiment of a portion of an integrated circuit package having a substrate constructed in accordance with the principles of the present invention.

Referring initially to FIG. 1, illustrated is a cross-sectional view of an embodiment of a portion of an integrated circuit package having a substrate 100 constructed in accordance with the principles of the present invention. The substrate 100 includes a transmission line conductor 110 and a planar conductor 120. The planar conductor 120 includes first, second and third apertures 125A, 125B, 125C that are a plurality of openings or voids in the planar conductor 120. The substrate 100 also includes an insulating material that surrounds the planar conductor 120 and fills the first, second and third apertures 125A, 125B, 125C. In the illustrated embodiment, the transmission line conductor 110 is positioned above the planar conductor 120 in the substrate 100. In an alternative embodiment, the transmission line conductor 110 may be positioned below the planar conductor 120. In the illustrated embodiment, the transmission line conductor 120 may be any conductor including a microstrip conductor.

The transmission line conductor 110 is one of a pair of transmission line conductors that employ and accommodate a differential electrical signal to form a signal transmission subsystem. The planar conductor 120 employs the first, second and third apertures 125A, 125B, 125C to form an equalization subsystem that provides a substantially equivalent transmission environment for the pair of transmission line conductors including the transmission line conductor 110. The signal transmission subsystem and the equalization subsystem combine to form a transmission equalization system.

An embodiment of a method of manufacturing an integrated circuit package includes providing the substrate 100. At least a pair of transmission line conductors are formed in the substrate 100 and at least one aperture is positioned and oriented proximate the pair of transmission line conductors to provide a substantially equivalent transmission environment for each of the pair of transmission line conductors. The substantially equivalent transmission environment allows an acceptable level of imbalance between the differential signals employed on the pair of transmission line conductors impacted by the aperture. In the illustrated embodiment, a plurality of the pair of transmission line conductors is formed in the substrate 100 and the equalization subsystem comprises forming a plurality of the apertures.

The positioning and orienting of each of the apertures intersects each of the pair of transmission conductors in substantially commensurate proportion thereby providing a substantially equivalent transmission environment for each of the pair of transmission conductors. Alternatively, the positioning orienting of the plurality of apertures may lie completely between two sets of the pair of transmission conductors or the plurality of the apertures may be formed in at least two different orientations. Additionally, an aperture may be square in cross-section or have other cross-sectional characteristics such as circular, rectangular or another appropriate shape.

Figure 2:
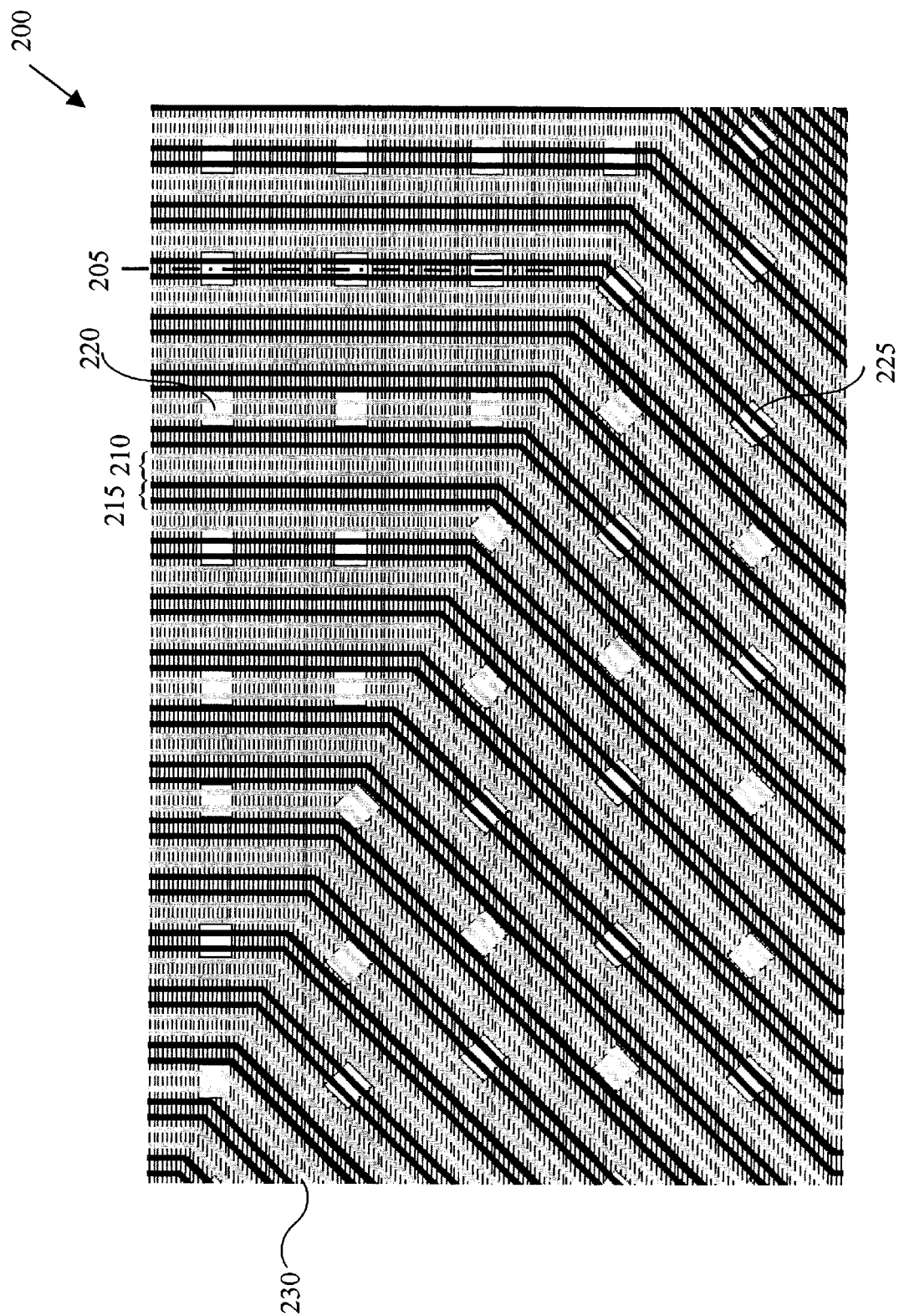
FIG. 2 illustrates a plan view of an embodiment of a substrate employing a transmission equalization system constructed in accordance with the principles of the present invention.

Turning now to FIG. 2, illustrated is a plan view of an embodiment of a substrate 200 employing a transmission equalization system constructed in accordance with the principles of the present invention. The substrate 200 includes a plurality of pairs of transmission line conductors shown as alternating light and dark pairs in FIG. 2 wherein a first pair of conductors 210 and a second pair of conductors 215 are generally representative, respectively. Additionally, the substrate 200 also includes a plurality of substantially square apertures wherein first and second apertures 220, 225 are generally representative. The plurality of apertures are contained in a planar conductor 230 represented by the horizontal lines shown in FIG. 2. The cross-sectional view of the substrate 100 of FIG. 1 would be representative of cross-section through the portion of substrate 200 shown as a section 205 in FIG. 2.

In a first portion of the substrate 200 containing the first aperture 220, the plurality of apertures are seen to be substantially positioned periodically and have a similar orientation. Similarly, in a second portion of the substrate 200 containing the second aperture 225, the plurality of apertures are also seen to be substantially positioned periodically and also have a similar orientation. However, the actual positions and orientations are seen to be different in the two portions of the substrate 200. In an alternative embodiment, the position and orientation of an aperture or a plurality of apertures may be aperiodic and random, and the cross-section of an aperture may assume any shape, as advantageous to meet the demands of a plurality of pairs of transmission line conductors.

In both the first and second portions of the substrate 200, the position and orientation of each of the plurality of apertures is ordered to either lie completely between two sets of a pair of transmission line conductors or to intersect each of a pair of transmission line conductors in substantially commensurate proportion. That is, if an aperture intersects a pair of transmission line conductors, it provides a substantially equivalent transmission environment for each of the pair of transmission line conductors, as noted earlier.

Figure 3:
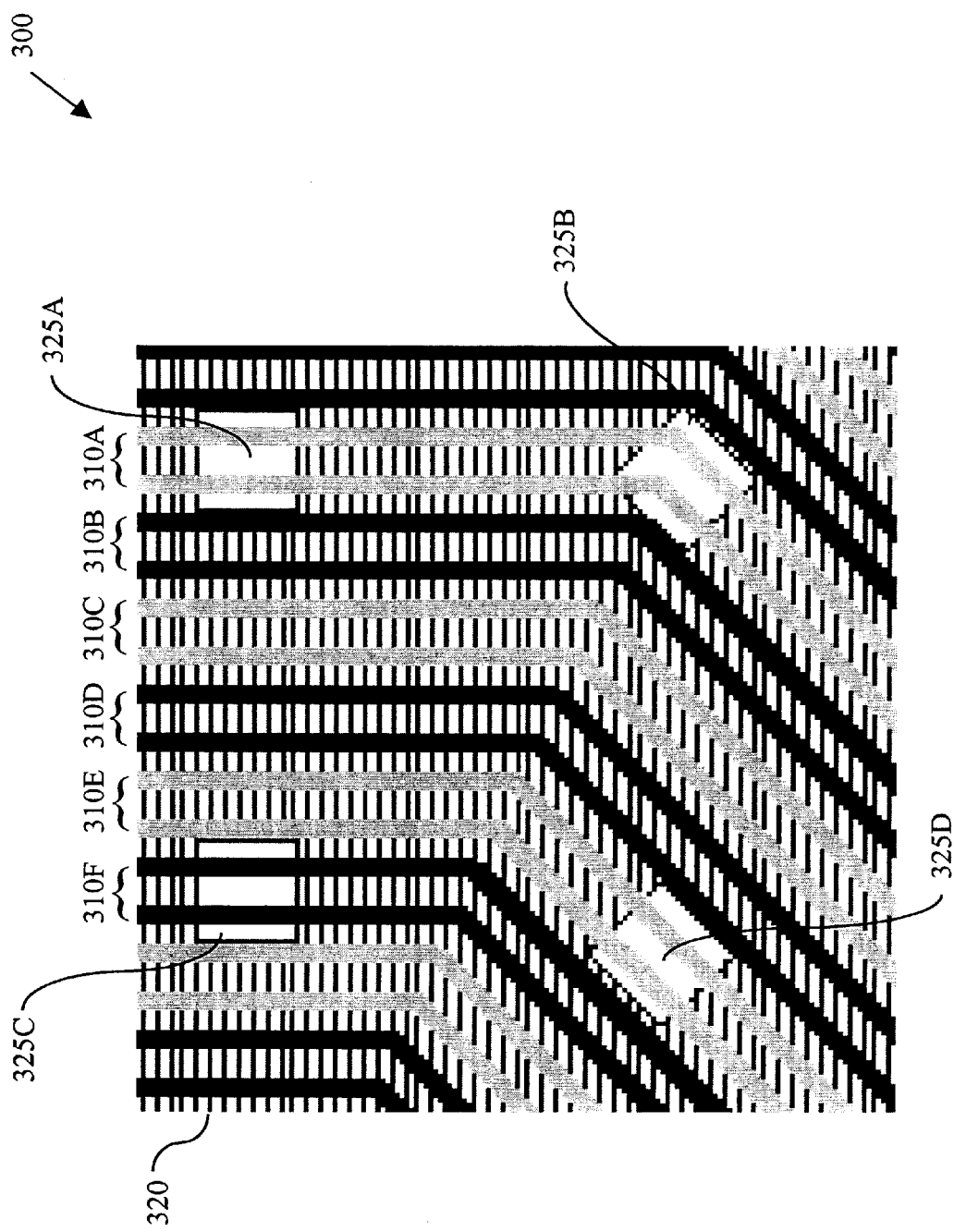
FIG. 3 illustrates a plan view of an embodiment of an enlarged portion of a substrate constructed in accordance with the principles of the present invention.

Turning now to FIG. 3, illustrated is a plan view of an embodiment of an enlarged portion of a substrate 300 constructed in accordance with the principles of the present invention. The substrate 300 includes first, second, third, fourth, fifth and sixth pairs of transmission line conductors 310A, 310B, 310C, 310D, 310E, 310F collectively referred to as a plurality of pairs of transmission line conductors 310A–310F. The substrate 300 also includes first, second, third and fourth apertures 325A, 325B, 325C, 325D, which are contained in a planar conductor 320 represented by the horizontal lines shown in FIG. 3.

The first and third apertures 325A, 325C are positioned and oriented to intersect each of the first and sixth pairs of transmission line conductors 310A, 310F, respectively, in a portion that is essentially commensurate (i.e., equal or symmetrical). For example, the first aperture 325A is positioned over the first pair of transmission line conductors 310A in such a way that each trace of the first pair of transmission conductors 310A is essentially equally exposed to or influenced by the first aperture 325A. This ensures that any signal distortion is equally experienced by both of the first pair of transmission conductors 310A. Therefore, this intersection provides an equivalent transmission environment that is essentially equal for a differential electrical signal employed on the first and sixth pairs of transmission line conductors 310A, 310F, respectively.

The second and fourth apertures 325B, 325D are positioned and oriented to intersect the first and fifth pairs of transmission line conductors 310A, 310E in a portion that is substantially commensurate (i.e., substantially equal or symmetrical). This intersection provides a substantially equivalent transmission environment that may be slightly imbalanced to the differential electrical signals employed on the first and sixth pairs of transmission line conductors 310A, 310F, respectively. However, any imbalance may be controlled to be within an acceptable range. Additionally, any imbalance caused by the first, second, third and fourth apertures 325A, 325B, 325C, 325D on each of the plurality of pairs of transmission line conductors 310A–310F that are not intersected may also be controlled to be within an acceptable range. This may be accomplished by adapting the position and orientation of the appropriate apertures as required.

In summary, several embodiments of a transmission equalization system for use with an integrated circuit package have been presented. Each of the embodiments of the present invention provides a substantially equivalent transmission environment for a differential transmission signal that traverses a pair of transmission line conductors employed in a substrate associated with the integrated circuit package. This substantially equivalent transmission environment maintains differential signal mode integrity thereby allowing lower-level or higher-speed signals to be accommodated.

Although the present invention has been described in detail, those skilled in the art should understand that they can make various changes, substitutions and alterations herein without departing from the spirit and scope of the invention in its broadest form.

What is claimed is:

1. For use with an integrated circuit package including a substrate, a transmission equalization system, comprising:
    a signal transmission subsystem having a pair of transmission line conductors located in said substrate and employing a differential electrical signal; and
    an equalization subsystem located on only one side of said pair of transmission line conductors employing at least one aperture positioned and oriented to provide a substantially equivalent transmission environment for each of said pair of transmission line conductors.

2. The transmission equalization system as recited in claim 1 wherein said signal transmission subsystem comprises a plurality of said pair of transmission line conductors and said aperture is positioned and oriented to lie completely between two sets of said pair of transmission conductors.

3. The transmission equalization system as recited in claim 1 wherein said equalization subsystem is formed within a planar conductor of said integrated circuit package.

4. The transmission equalization system as recited in claim 1 wherein said aperture is positioned and oriented to intersect each of said pair of transmission conductors in substantially commensurate proportion.

5. The transmission equalization system as recited in claim 1 wherein an insulating material is located between said signal transmission subsystem and said equalization subsystem, said insulating material substantially filling said aperture.

6. The transmission equalization system as recited in claim 1 wherein said equalization subsystem comprises a plurality of said apertures.

7. The transmission equalization system as recited in claim 6 wherein said plurality of said apertures have at least two different orientations.

8. A method of manufacturing an integrated circuit package, comprising:
    providing a substrate;
    forming at least a pair of transmission line conductors in said substrate;
    positioning and orienting at least one aperture on only one side of said pair of transmission line conductors to provide a substantially equivalent transmission environment for each of said pair of transmission line conductors.

9. The method of manufacturing as recited in claim 8 further comprising forming a plurality of said pair of transmission line conductors and wherein said positioning and orienting of said aperture lies completely between two sets of said pair of transmission conductors.

10. The method of manufacturing as recited in claim 8 wherein said positioning and orienting of said aperture is formed within a planar conductor of said integrated circuit package.

11. The method of manufacturing as recited in claim 8 wherein said positioning and orienting of said aperture intersects each of said pair of transmission conductors in substantially commensurate proportion.

12. The method of manufacturing as recited in claim 8 further comprising forming an insulating material between said transmission line conductors and said aperture, said insulating material substantially filling said aperture.

13. The method of manufacturing as recited in claim 8 wherein said positioning and orienting comprises forming a plurality of said apertures.

14. The method of manufacturing as recited in claim 13 wherein said plurality of said apertures are formed in at least two different orientations.

15. An integrated circuit package, comprising:
    a substrate; and
    a transmission equalization system, including:
        a signal transmission subsystem having a pair of transmission line conductors located in said substrate and employing a differential electrical signal; and
        an equalization subsystem located on only one side of said pair of transmission line conductors that employs at least one aperture positioned and oriented to provide a substantially equivalent transmission environment for each of said pair of transmission line conductors.

16. The integrated circuit package as recited in claim 15 wherein said signal transmission subsystem comprises a plurality of said pair of transmission line conductors and said aperture is positioned and oriented to lie completely between two sets of said pair of transmission conductors.

17. The integrated circuit package as recited in claim 15 wherein said equalization subsystem is formed within a planar conductor of said integrated circuit package.

18. The integrated circuit package as recited in claim 15 wherein said aperture is positioned and oriented to intersect each of said pair of transmission conductors in substantially commensurate proportion.

19. The integrated circuit package as recited in claim 15 wherein an insulating material is located between said signal transmission subsystem and said equalization subsystem, said insulating material substantially filling said aperture.

20. The integrated circuit package as recited in claim 15 wherein said equalization subsystem comprises a plurality of said apertures.

21. The integrated circuit package as recited in claim 20 wherein said plurality of said apertures have at least two different orientations.

* * * * *